(12) United States Patent
Suzuki

(10) Patent No.: US 7,412,656 B2
(45) Date of Patent: Aug. 12, 2008

(54) METHOD OF DATA PROCESSING SERVICE FOR DIGITAL CAMERA AND SYSTEM USING THE SAME

(75) Inventor: Shoji Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 282 days.

(21) Appl. No.: 09/842,017

(22) Filed: Apr. 26, 2001

(65) Prior Publication Data

US 2002/0071043 A1   Jun. 13, 2002

(30) Foreign Application Priority Data

Dec. 13, 2000   (JP) ............................. 2000-378462

(51) Int. Cl.
*H04N 5/76* (2006.01)
*G06F 11/00* (2006.01)

(52) U.S. Cl. .................................. 715/746; 348/231.99

(58) Field of Classification Search ................. 345/744, 345/745, 837, 748, 740; 715/717, 718, 721, 715/722, 728, 731, 739, 723, 746, 764, 965; 348/207.1, 231.99, 552, 223.1; 382/224
See application file for complete search history.

(56) References Cited

U.S. PATENT DOCUMENTS

| | | | | |
|---|---|---|---|---|
| 5,845,166 A * | 12/1998 | Fellegara et al. | ............. | 396/429 |
| 5,861,918 A * | 1/1999 | Anderson et al. | ......... | 348/231.9 |
| 6,084,631 A * | 7/2000 | Tonkin et al. | ............. | 348/211.6 |
| 6,104,430 A * | 8/2000 | Fukuoka | ................... | 348/231.6 |
| 6,104,885 A * | 8/2000 | McIntyre et al. | ............. | 396/319 |
| 6,274,283 B1 * | 8/2001 | Yamamoto | ................... | 430/30 |
| 6,337,712 B1 * | 1/2002 | Shiota et al. | ............. | 348/231.1 |
| 6,337,951 B1 * | 1/2002 | Nakamura | .................... | 396/57 |
| 6,396,963 B2 * | 5/2002 | Shaffer et al. | ................ | 382/305 |
| 6,429,923 B1 * | 8/2002 | Ueda et al. | ..................... | 355/40 |
| 6,588,667 B1 * | 7/2003 | Nakano et al. | ......... | 235/462.15 |
| 6,628,325 B1 * | 9/2003 | Steinberg et al. | ......... | 348/211.1 |
| 6,630,949 B1 * | 10/2003 | Yamagishi | ............. | 348/207.99 |
| 6,657,660 B2 * | 12/2003 | Haneda et al. | ......... | 348/231.99 |
| 6,697,090 B1 * | 2/2004 | Nagasaka et al. | ........... | 715/769 |
| 6,774,935 B1 * | 8/2004 | Morimoto et al. | ........ | 348/211.5 |
| 6,788,431 B1 * | 9/2004 | Yamaguchi | .................. | 358/1.9 |
| 6,795,715 B1 * | 9/2004 | Kubo et al. | ............... | 455/556.1 |
| 6,810,149 B1 * | 10/2004 | Squilla et al. | ................ | 382/224 |
| 6,810,441 B1 * | 10/2004 | Habuto et al. | .................. | 710/20 |
| 6,850,272 B1 * | 2/2005 | Terashita | .................. | 348/223.1 |
| 2002/0048413 A1 * | 4/2002 | Kusunoki | .................... | 382/282 |
| 2002/0196852 A1 * | 12/2002 | Yamada et al. | ......... | 375/240.13 |
| 2003/0007169 A1 * | 1/2003 | Tanaka et al. | ............... | 358/1.15 |

\* cited by examiner

*Primary Examiner*—Steven P Sax
(74) *Attorney, Agent, or Firm*—Staas & Halsey LLP

(57) ABSTRACT

Disclosed is a data processing service for digital camera having a storage medium with a capacity for small number of images. The service is intended to increase obtainable number of images in an easy and less expensive manner while the user carries the camera away from home. A method of the service conducted at a shop (3-1) includes; a step for reading a photographed image data recorded in a memory (10) of a digital camera (1) using a service terminal (6); and a step for preserving the read-in photographed image data to a storage medium (2, 4) accessible by the user. After the photographed image data is transferred, the user can take additional photographs using the original recoding medium in the digital camera.

5 Claims, 5 Drawing Sheets

METHOD OF DATA PROCESSING SERVICE FOR DIGITAL CAMERA AND SYSTEM USING THE SAME

FIELD OF THE INVENTION

The present invention relates to a method of data processing service for facilitating convenient use of a small and compact digital camera, and a data processing system using the method.

BACKGROUND OF THE INVENTION

As the digital camera becomes popular in recent years, many users are now taking digital photographs easily. In the year 1999, digital cameras of 5,850 thousand sets were shipped throughout the world. Also, the shipment of more than 10 million sets is estimated in 2000. Technically, the performance of the digital camera has remarkably been improved. A high-resolution type digital camera having even more than 3 million pixels has been put into the market.

Major advantages of the digital camera are; the photographed image can been instantly on the spot, a scene can be photographed repeatedly until the photographer feels satisfied, and development cost required for a film camera is not necessary. Accordingly, a user can take photographs easily as many times as the user desires. Most users want the digital camera can easy be handled to almost the same extent as they use a conventional film camera.

The digital camera is generally used in a following manner: first a user takes a digital photograph by a digital camera. The obtained image data can be confirmed using a monitor of a liquid crystal display, etc. included in the camera. Furthermore, the image data is stored into a storage medium (such as a fixed-mounted internal memory, or a removable semiconductor memory card called Compact Flash, Smart Media, etc.)

In general, the maximum number of photographs is limited by the capacity of a storage medium housed in the digital camera. When it is required to take more photographs, it is required for the user to erase the image that was once taken. Otherwise, in case the camera is configured so that the storage medium is exchangeable, the user replaces the storage medium with a spare medium being carried.

The stored image data is mainly for use in a personal computer (PC) or print out using a color printer after the user gets home. More specifically, the digital camera user, after getting home, transfers the image data to a hard disk or other storage medium such as a magnetic optical disk (MO), CD-R or floppy disk for use in the user's PC. Furthermore, using an application software (commercially sold, or attached to the digital camera product) in the PC, the images are processed for generating thumbnail pictures or enhancing image quality, or used for print out.

The digital camera is required to be compact in size and light in weight, as ordinarily required to the conventional film camera, so that the user can easily carry while travelling. There have been developed a variety of digital cameras, including the type either having an internal memory, a removable memory or a large capacity disk drive, etc.

When the digital camera has a drive for optical disks (DVD, MO, etc.) a relatively large amount of photographs can be taken making use of a large capacity storage medium. However, the digital camera that includes the disk drive mechanism becomes larger in size and heavier, which becomes a disadvantage in portability as compared to the conventional film camera.

On the other hand, in other type of the digital camera having no disk drive mechanism, semiconductor memory is mounted for storing image data. This enables to decrease the size and weight. As an example, the weight becomes 200 to 400 grams that comes to be nearly the same as the compact film camera.

However, the capacity of memories (Compact Flash, Smart Media, etc.) currently attached to the digital camera is normally within the range of 8 MB (megabytes) to 16 MB. Currently, the image data of the digital camera tends to be higher in resolution, reaching nearly 1 MB per picture in a high quality mode (with less data compression). In such cases, at most 10 photographs can be stored in one storage medium. Therefore, when the camera is constituted by fixed (not removable) storage medium, the user has to limit the number of photographs to take, or put up with a decreased image quality. It is inconvenient especially when the user wants to take a large amount of high quality photographs especially during travelling.

In case of the digital camera having a removable storage medium, the user will purchase an additional storage medium to carry with the camera, so that the user can take photographs without feeling any restriction about the capacity. Nevertheless, the semiconductor storage medium such as Compact Flash is still expensive (for example, the price of a Compact Flash card having the capacity of 128 MB is approximately 40 thousand in Japanese Yen). This may be equal to the price of the digital camera itself. Therefore, it is not easy to have a spare storage medium.

One way to override the problem of memory capacity in the digital camera is that the user carries another disk drive mechanism or small sized PC together with the camera in order to preserve the photographed images into the disk drive mechanism or the PC. This method is, however, troublesome because the portable PC or the disk drive mechanism weighs too much (on the order of 1 kilogram) to carry with the camera. In addition, such portable equipment is expensive to carry as a backup. For these reasons, it is difficult to provide the easiness in portability such as the conventional film camera to the digital camera.

SUMMARY OF THE INVENTION

Accordingly, it is an object of the present invention to provide data processing service for the digital camera and a system using the services, to improve the utility of the small-sized, light digital camera.

It is another object of the present invention to provide data processing services and a system using the services, to increase easily in a cost-saving manner the number of photographs to be taken by the digital camera having a small memory capacity, when the user is away from home.

It is still another object of the present invention to provide data processing services and a system using the service to take digital photographs easily without being affected by the restriction of the memory capacity of the digital camera.

According to the present invention, a method of data processing service for achieving the above-mentioned objects includes; a step for reading at a shop the photographed image data stored in a memory of user's digital camera; and a step for preserving at the shop the aforementioned photographed image data into a storage medium which is accessible by the user.

It is assumed that the user carries a small-sized, light digital camera having the memory capacity of substantially small number of pictures while being away from home, especially while traveling. According to the present invention, after taking photographs, the user brings the camera with the stored image data to the shop provided with a service terminal, where the stored image data can be transferred to other storage medium for preservation. Thus the user can use the digital camera to take photographs easily without feeling anxious about the data capacity or troublesome labor of preservation or printing. From the viewpoint of the shop, the services introduced in the shop such as a convenience store may contribute to increase clients. The services, when conducted on a charging basis, may effect the shop to get commission income as well as the increase of clients.

As an aspect of the present invention, preferably the preserving step comprises a step of preserving to the storage medium possessed by the user. The user is promoted to use the storage medium of specified type, enabling the shop to promote to sell the storage medium or a drive.

As another aspect of the present invention, preferably the preserving step comprises a step for transferring the image data for preservation to a storage medium accessible by the user through a network. Thus the preservation of image data becomes possible without necessitating the user to carry an extra storage medium or equipment.

Further, as another aspect of the present invention, preferably the aforementioned read-in step comprises a step for identifying the type of the digital camera and a step for reading in the image data stored in the memory of the digital camera with a reading method according to the identified type of the digital camera. This enables the shop to provide data processing services for different types of cameras produced by various manufacturers.

Further scopes and features of the present invention will become more apparent by the following description of the embodiments with the accompanied drawings.

DETAILED DESCRIPTION OF THE PREFERRED EMBODIMENTS

The preferred embodiments of the present invention are described hereinafter referring to the charts and drawings, wherein like numerals or symbols refer to like parts. The explanation on the embodiment of the invention begins with data processing service system for the digital camera, followed by a service processing terminal equipment and other embodiments.

[Data Processing Service System]

Figure 1:
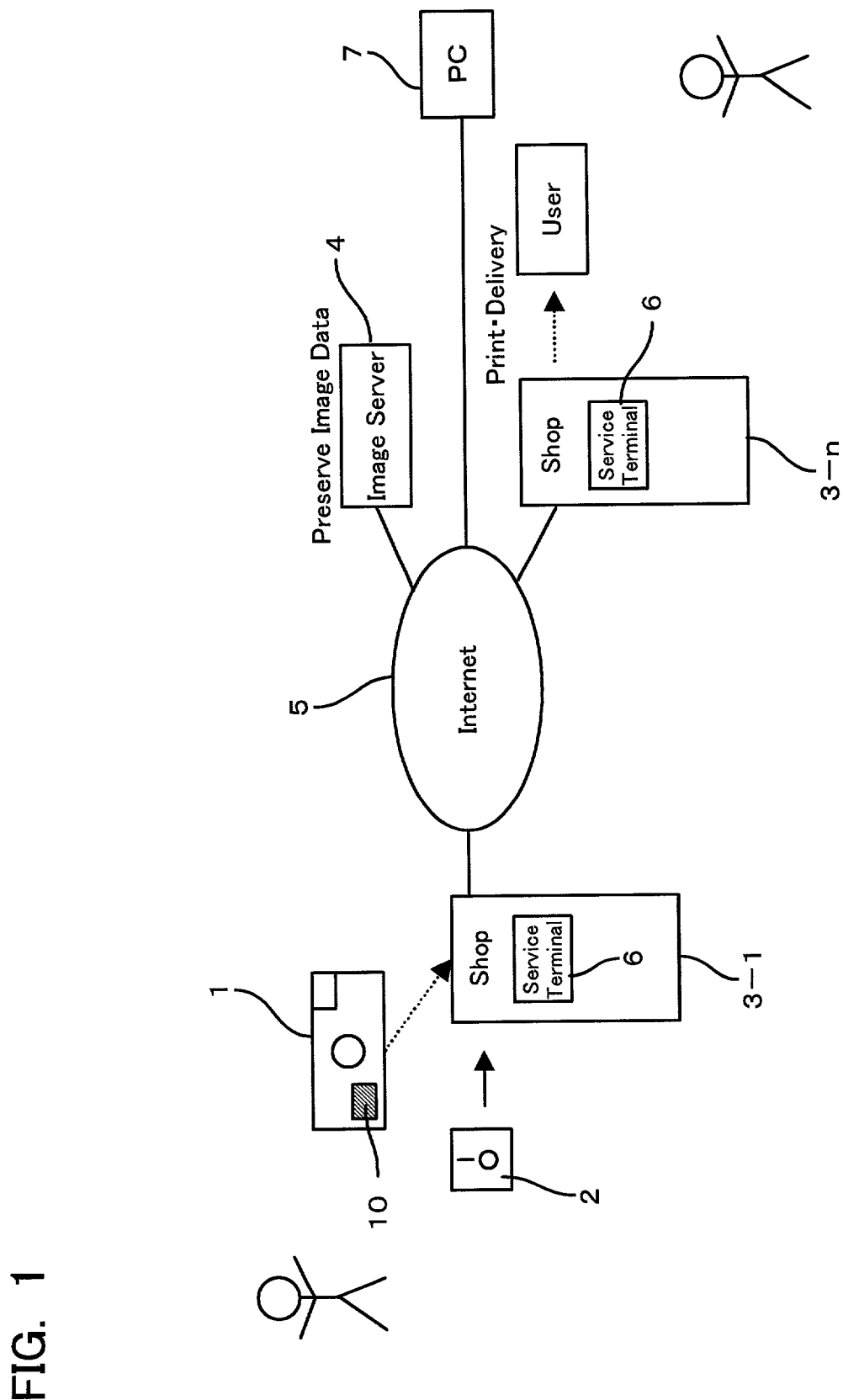
FIG. 1 shows a system configuration of data processing service for a digital camera based on one embodiment of the present invention.
Figure 2:
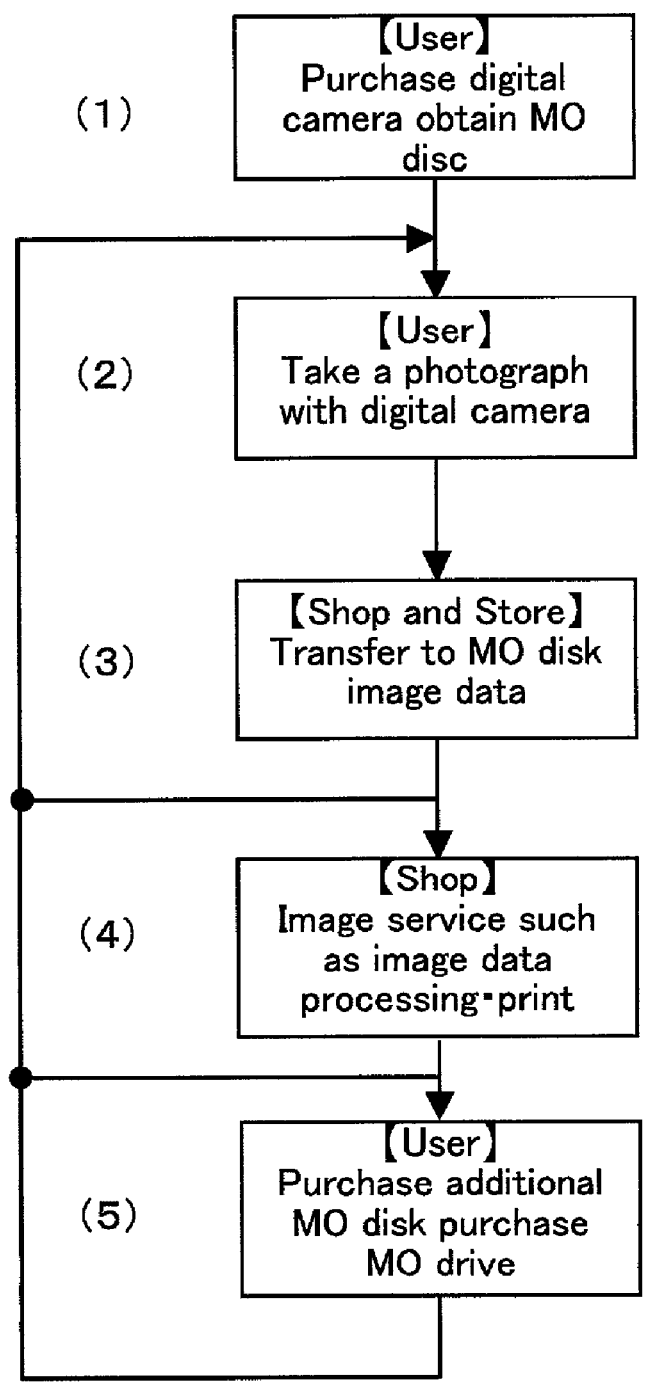
FIG. 2 shows an explanatory flowchart of the service according to the system shown in FIG. 1.

In FIG. 1, there is shown a configuration of data processing service system according to an embodiment of the present invention. Also, FIG. 2 is a flowchart of the data processing service.

In FIG. 1, a digital camera 1 having no disk drive mechanism is considered. The digital camera 1 of this type typically includes either a removable memory card and a liquid crystal display, or an embedded (i.e. not removable) memory. The digital camera 1 for taking not only still images but also moving images is also included.

A service terminal 6 is provided in a store 3-1 to 3-n, including a DPE shop, convenience store, kiosk, or a souvenir shop at a tourist resort. Service terminal 6 in each shop 3-1 to 3-n is connected to service terminals 6 located in other shops, an image server 4 and a user's personal computer (PC) 7, through a communication network such as the Internet 5.

This service terminal 6 is constituted by either one of a general-purpose terminal or a terminal for dedicated use, each based on a PC having a storage drive mechanism. Service terminal 6 is provided for the purposes of image preservation, image processing, and printing services. Image server 4 is for use in storing image data (photographed images) transferred from service terminal 6.

Storage medium 2 is a large capacity storage medium consisting of, for example, a magnetic optical disk (MO) having a capacity of 650 MB or more. When this storage medium 2 is mounted on digital camera 1, digital camera 1 becomes large in size and heavy. Therefore the photographed image data is transferred and preserved to the storage medium 2.

In FIG. 2, a basic flow of the data processing service according to the present invention is illustrated hereafter, taking an example of an MO disk (magnetic optical disk) as a storage medium.

(1) An MO disk 2 is distributed to a purchaser (i.e. user) of digital camera 1 as an attachment thereto. Alternatively, the MO disk 2 may be distributed free of charge to the registration subscriber of digital camera 1. In this MO disk 2, information such as an ID (for example, the manufacturer's name, the camera type, etc.) of the digital camera 1 is stored prior to the delivery.

(2) The user takes photographs using digital camera 1 while going out, travelling or the like, carrying digital camera 1 and MO disk 2. The photographed image data are stored into a storage medium (such as Compact Flash) 10 mounted in digital camera 1.

(3) When storage medium 10 in digital camera 1 is thoroughly used, the user brings digital camera 1 together with MO disk 2 into a shop nearly located (such as a convenience store, DPE shop or souvenir shop).

When the user desires to receive an image preservation service, the user connects digital camera 1 or storage medium 10 to service terminal 6 through wire or wireless, as well as inserting his MO disk 2 into an MO disk drive mechanism provided in the shop. Service terminal 6 identifies the property of digital camera 1 using the ID stored in MO disk 2, to read in image data stored in digital camera 1 or storage medium 10. When the user desires to preserve the read image data in MO disk 2, the image data read in are transferred to MO disk 2 for preservation. The data transfer is carried out directly from the storage medium (Compact Flash, Smart Media, etc.), or through the interface such as the USB (universal serial bus).

After the photographed image data is transferred into MO disk 2, the user can erase the data having been stored in storage medium 10 of digital camera 1, enabling new photographs to be taken. Such a simple service at the shop as transferring image data (with the aforementioned ID) into MO disk 2 for preservation may be carried out free of charge.

(4) Further processing services including image data enhancement may be carried out with charge. For example, image processing or printing service using image data read by service terminal 6 is carried out upon user's request. These services may include producing thumbnail pictures (scaledown pictures), producing HTML data (into an album-like style), enhancing image quality, and simultaneous printing, etc. The data transfer is carried out from the storage medium (Compact Flash, Smart Media, etc.) or through the interface such as the USB.

In addition, service terminal 6 provides services conducted through the network. The services include data storing, data transfer, printing, delivery, etc. Namely, from service terminal 6 provided at the shop, image data are transmitted via network 5, to preserve in a large capacity storage (such as a hard disk) in server 4.

The user may use this storage as a backup file for image data stored in the user's own MO disk, or for images which are not necessarily stored near at hand (for example, photographs not well taken, a large amount of images of the similar scenes, etc.) Alternatively, instead of preserving the images in MO disk 2, the images are preserved in server 4 depending on the user's choice. When necessary, the user can download the photographed image data after accessing server 4 from PC 7 at home.

Further, it may also be possible to transfer the image data to a remote service terminal 6 in the different shop 3-n if the user requests the image to be printed out at the remote service terminal 6. The remote service terminal 6 prints out the image data. Furthermore, the print out may be delivered to another location specified by the user.

(5) The user, when necessary, purchases additional MO disk 2, or an MO disk drive and efficiently utilizes the images preserved in MO disk 2.

According to such data processing services, the following problems can be solved.

First, a small and light digital camera generally has a small capacity of internal memory or storage medium 10 attached to the camera when purchased. It is difficult to take a large amount of photographs. Therefore, the user has to photograph a restricted number of pictures especially while travelling, or to purchase to carry another storage medium to photograph larger number of pictures. However, the small and light semiconductor storage medium is generally expensive.

In this data processing service, service terminal 6 is provided in the shop such as the convenience store. The user brings digital camera 1 and MO disk (typically having the capacity of 640 MB, or more) into the shop to make the recorded image data in digital camera 1 transferred to MO disk 2 for preservation. Accordingly, the user can now photograph new pictures using this digital camera 1 having a small capacity of storage medium without purchasing extra storage medium. Also, if the first MO disk is provided free of charge attached to the purchased camera, the user is not required to purchase expensive storage medium.

Similarly, by preserving the image data to server 4 after transmitted through the Internet 5, the user can take a large number of photographs using digital camera 1 having a small capacity of storage medium. Purchasing expensive storage medium is not needed.

Generally, for the user who owns a PC but not fully experienced in using the PC, it is troublesome as well as time-consuming to transfer the image data recorded in the digital camera to the hard disk in the PC, or even difficult for such user to process images (producing thumbnail pictures, enhancing image quality, or converting into HTML format, etc.) and to print. According to the system of the present invention, data transfer and preservation services are conducted by the operation of the store clerk, or performed by automatic equipment of which operation is easier than the operation of the PC. Therefore the user's load can be decreased substantially.

Further, as additional pay services in the shop, various processing (process to thumbnail pictures, image quality enhancement, printing, etc.) can be received. This enables easy and beneficial use of the digital camera, as well as efficient utilization of the photographed images.

In addition, the user's visit to the shop for receiving the service produces an extra effect to increase the number of clients as well as the possibility of additional sales of other commodities in the shop.

The above services may also benefit the manufacturers of the MO disk drive, recording media, printer, as well as the digital camera, because the aforementioned services may contribute to gain superiority over the competitors. The increased number of users may well result in the sales increase of the manufactures.

Furthermore, in general, the reading procedure of the recorded image data from the digital camera may be different, depending on the manufacturer's technique. By recording an ID to MO disk 2 in advance, the reading procedure can be determined automatically. Accordingly, it becomes easy to perform the reading processing at the shop, selectively determined out of various types of digital cameras of different manufacturers.

In the above description, the MO disk has been taken as an example of a large capacity storage medium. Alternatively, it may be possible to use other types of optical disks, such as CD-R, CD-RW, DVD, etc., the optical card, or the magnetic disk. Service terminal 6 may be used at least for conducting the image data preservation service to the storage medium or the preservation service to the memory in the server.

[Service Processing Terminal]

Figure 3:
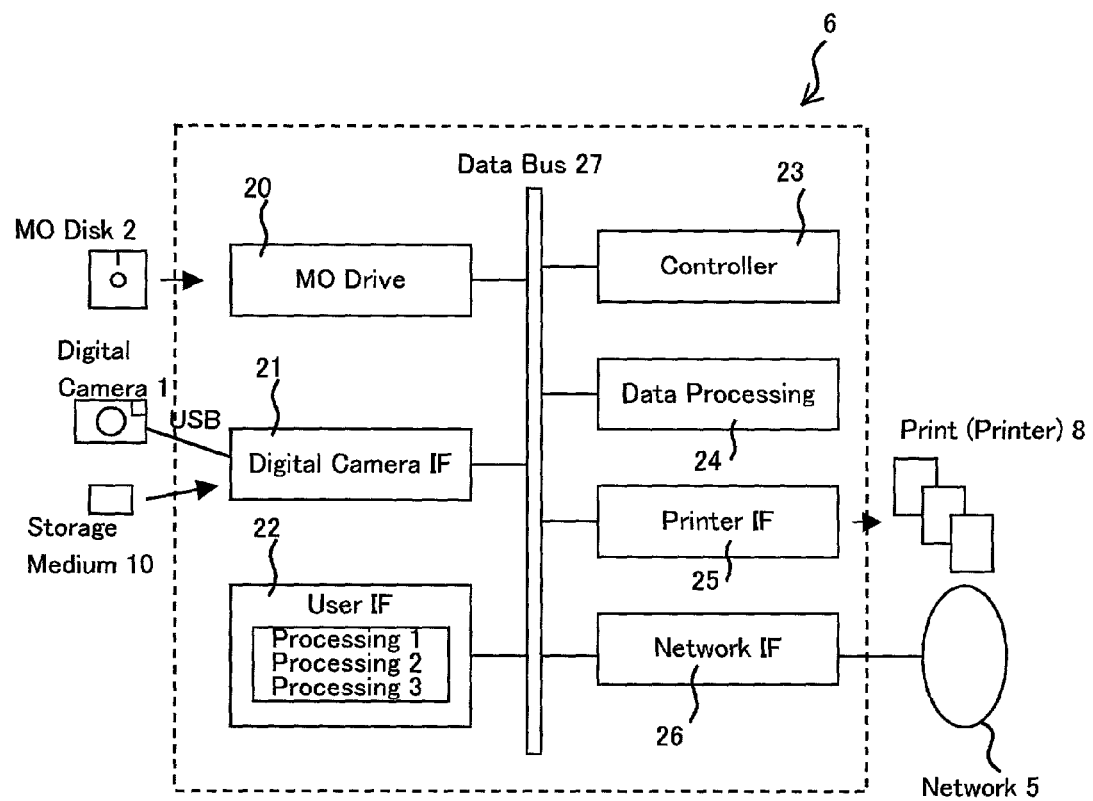
FIG. 3 shows a configuration diagram of a service processing terminal according to FIG. 1.
Figure 4:
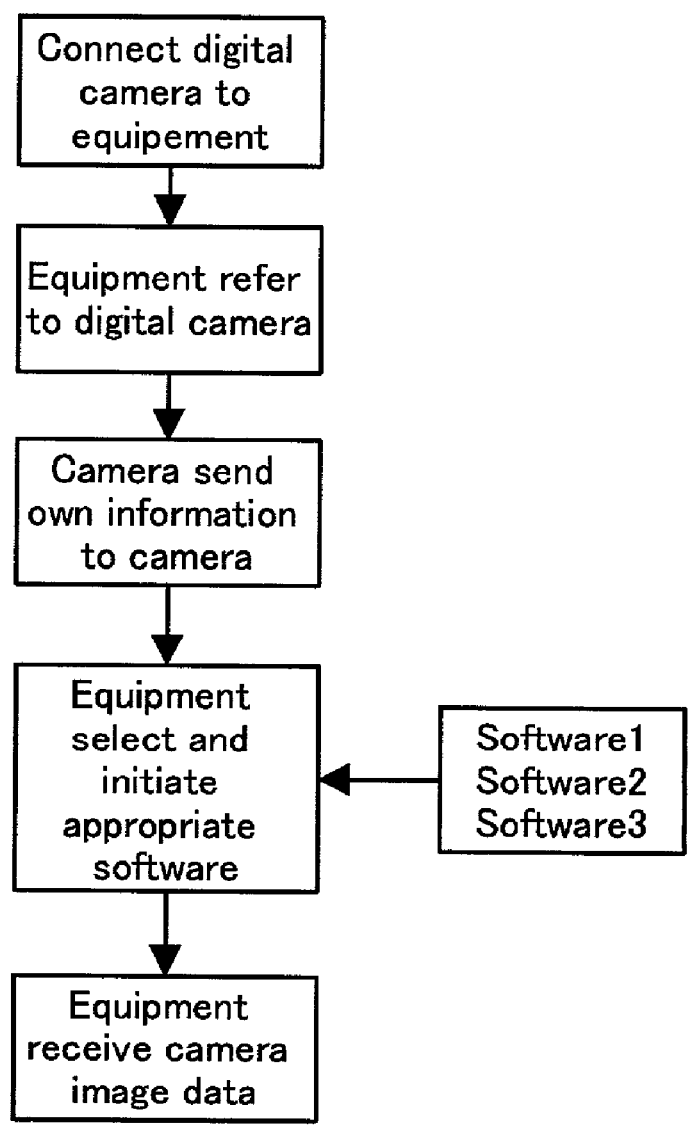
FIG. 4 shows a flowchart indicating a read-in process of image data from the digital camera.

In FIG. 3, there is shown a configuration diagram of a service processing terminal in accordance with an embodiment of the present invention. In FIG. 4, a flowchart of the image data reading processing is shown, and, in FIG. 5, a flowchart of the image data service processing is shown.

Service processing terminal 6 includes an MO disk drive 20, an interface portion (IF) 21 to digital camera 1, a user interface (IF) portion 22, an overall controller 23 related to data read, write and other processing (including CPU, work memory, OS, etc.), a data processor 24, a printer interface (IF) portion 25, a network interface (IF) portion 26, and a data bus 27.

MO disk drive 20 rotates MO disk (magnetic optical disk) 2 inserted thereto to perform data read/write operation through a head. Digital camera IF portion 21 transmits and receives data to/from digital camera 1. User IF portion 22 further includes a display unit, keyboard, mouse, etc. to be used for specifying any of the plurality of digital camera services 1, 2 or 3 to be served to the user.

Data processing portion 24 includes a part of overall control function, such as a processor for image processing. Printer IF portion 25 transmits and receives data to/from a color printer 8 connected thereto. Network IF portion 26 interfaces with network 5.

The operation of this service terminal equipment 6 is illustrated hereinafter. First, the user or the store clerk connects digital camera 1 with service terminal equipment 6 using an interface such as the USB, or, alternatively, inserts storage medium 10 (such as Compact Flash) into service terminal equipment 6.

User's MO disk 2 is then inserted into MO disk drive 20, followed by a data transfer request from user IF portion 22. Overall controller 23 reads image data from digital camera 1 or storage medium 10 through digital camera IF portion 21 to transfer to MO disk drive 20. Thus the image data recorded in digital camera 1 is stored into MO disk 2.

In case the image processing is carried out onto the read-in data after data transfer is completed, one or more processing out of processing 1, 2 and 3 is selectively requested through user IF portion 22 for further processing. On receipt of this request, overall controller 23 indicates the image processing onto the image data, to print out with color using printer 8, or to distribute the data through the network.

In FIG. 4, there is shown a flowchart of processing carried out by digital camera IF portion 21 in service terminal equipment 6 shown in FIG. 3. In this embodiment, the USB interface is taken as an example.

(S10) When the connection between digital camera 1 or storage medium 10 and digital camera IF portion 21 is established, digital camera IF portion 21 first inquires about the name of the digital camera manufacturer.

(S11) In controller 23 of service terminal equipment shown in FIG. 3, plural kinds of software are maintained in advance for receiving digital camera image data. Each software corresponds to the respective reading methods applied by each manufactures. On receiving a response from digital camera 1 or storage medium 10, an appropriate software is read in to initiate the reading operation of image data from digital camera 1 or storage medium 10.

Alternatively, the ID data recorded in MO disk 2 is read in to select and initiate an appropriate software for receiving the digital camera image. According to this method, the ID recorded in MO disk is recognized to identify that the disk is attached to digital camera 1. Thus the transfer service is determined free of charge. On the other hand, if the ID is found incorrect, the transfer service may be continued on a charging basis. In this case, dishonest request can be prevented by collating the ID stored in MO disk with the response result received from digital camera 1.

Figure 5:
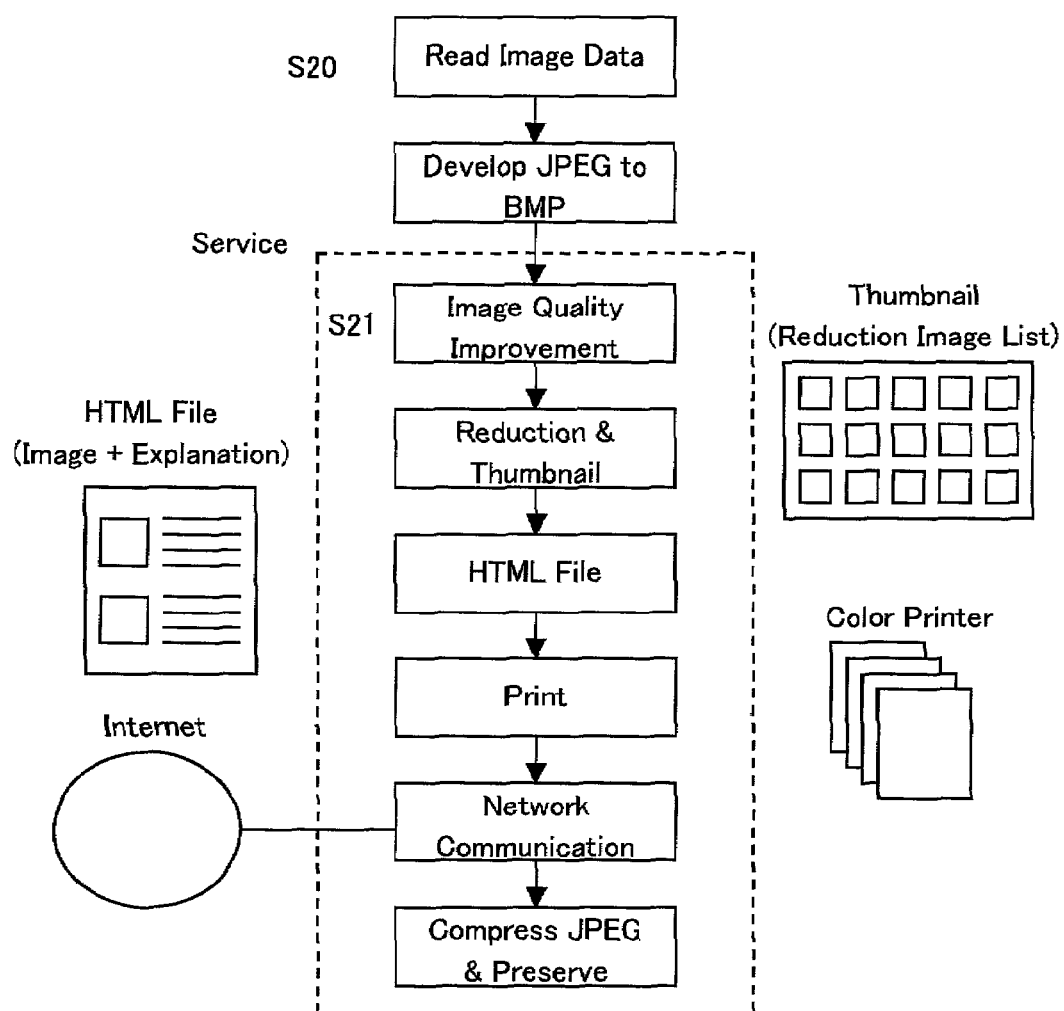
FIG. 5 shows a flowchart indicating a data processing service for the digital camera shown in FIG. 3.

In FIG. 5, there is shown a flowchart for digital camera processing service in service terminal equipment 6 shown in FIG. 3. There is shown an example of processing against image data read by service terminal equipment 6 shown in FIG. 3.

(S20) The image data read in by the processing shown in FIG. 4 is often the data compressed into the JPEG format. Therefore decompression is carried out first to convert into the BMP (bitmap) data format.

(S21) Then, as the image data processing, the following services are provided:

(1) image enhancement processing including adjustment of brightness, contrast, hue, etc.

(2) thumbnail pictures generation processing by decreasing the picture size (3) HTML file generation processing by the arrangement of image data (such as aligning images in reduced size and linking with the original images)

(4) preparation of data for printing and actual print processing using the printer (5) image data transmission/reception processing through the network, and (6) compression processing of the processed image data into JPEG format and preservation processing into MO disk 2 or the like.

Overall controller 23 performs image processing specified through user IF portion 22 including at least one of the aforementioned services. The service is provided with charge to be paid for each service.

For various processing such as image quality enhancement, thumbnail picture generation, file generation, printing and preserving, known arts conventionally used for image processing are applicable. Service processing using image data transmission/reception through the network is carried out as follows: the data is transmitted from the shop 3-1 shown in FIG. 1 through network 5. The transmitted data is then preserved in a large capacity memory equipment 4 (such as a hard disk in the server).

The user may utilize the image data thus preserved as either backup data against the image data kept in the user's MO disk, or archives of the images which were not well photographed or a large number of similarly photographed images. Alternatively, the user may use the storage for preserving the original image data instead of keeping in the user's own MO disk 2. It is also possible to provide the data preservation service with management charge, for example, on a monthly payment basis. Accordingly, the user becomes free from maintaining own image data, avoiding the risk of data loss. These image data can be retrieved from the PC 7 located at home.

Similarly, the following service may be realized: the image data or the processed image data into forms of a letter or a photo album is transferred from a shop 3-1 to the other shop 3-n, and is printed in shop 3-n to be handed over at the shop or delivered therefrom to the destination user. This will be used for transmitting, for example, a grandson's photo to his grandparents who live away in the hometown. Conventionally, when the user desires to send an image data through an electronic mail, etc., the recipient of that electronic mail has to be accustomed with operating the PC. However, by utilizing the aforementioned service, it is advantageous both for the sender who does not need to edit or process the image data, and for the recipient who can see the image instantly in a form of printed photograph.

[Other Embodiments]

In regard to the network, image data can be transmitted at high-speed when a dedicated line is used. For example, the dedicated line used for the convenience store chain can be used. Also, in regard to the service terminal 6, the terminal equipment can be an automatic machine operable by the user, without need of operation by the store clerk.

To sum up, the present invention produces the following effects:

(1) At the place away from home especially while travelling, a user uses a small and light digital camera easily which can record a small number of images. On completion of taking photographs the user brings the camera into the shop where the service terminal exists. The photographed image data can be transferred to other storage medium. Thus the user can reuse the small and light digital camera as much as the user likes without need of carrying spare storage medium that is expensive to purchase. The user becomes free from worrying about the data capacity or unnecessary work on data preservation or printing.

(2) The service introduced in the shop such as a convenience store, etc. may contribute to increase clients. If the services are introduced with charge, the services may contribute to increase commission income of the shop, as well as the increase of clients.

The foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. A data processing service system provided in a shop for a portable digital camera of a user, said digital camera temporarily connected to said processing system, comprising:

interface means for reading a photographed image data stored in a memory of said digital camera; and controller means for preserving said photographed image data to a storage medium accessible by a user, wherein the interface means is a single means to identify a type of said digital camera by reading information pre-stored in at least one of said memory of the digital camera and said digital camera, to select a reading method software corresponding to said identified type of said digital camera from a plural reading method software that are stored, and to read said photographed image data recorded in said memory of said digital camera using said selected reading method software corresponding to said identified type of said digital camera; and wherein said reading method software is for reading the photographed image data recorded in said memory of said digital camera to a memory of said controller means.

2. A method of data processing service provided in a shop for a portable digital camera of a user, comprising:

reading ID data recorded in at least one of a memory of the portable digital camera and said portable digital camera, using a single interface unit;

selecting, using said single interface unit, a reading method corresponding to the digital camera from the read ID data;

reading a photographed image data recorded in a memory of the digital camera using the selected reading method software corresponding to the digital camera from a plural reading method software that are stored; and preserving the photographed image data in a storage medium;

wherein said reading method software is for reading the photographed image data recorded in said memory of said digital camera to a memory of a controller.

3. A data processing service system in a shop for a portable digital camera of a user, said digital camera temporarily connected to said processing service system, comprising:

a single interface unit reading a photographed image data stored in a memory of the digital camera; and a controller preserving the photographed image data in a storage medium accessible by a user, wherein the single interface unit reads ID data recorded in the storage medium, selects a reading method software corresponding to the ID data of the digital camera from a plural reading method software that are stored, and reads the photographed image data recorded in the memory of the digital camera using the selected reading method software; and wherein said reading method software is for reading the photographed image data recorded in said memory of said digital camera to a memory of said controller.

4. A data processing service system provided in a shop for a portable digital camera of a user, said digital camera temporarily connected to said processing service system, comprising:

a single interface unit to read a photographed image data stored in a memory of the digital camera; and a controller to preserve the photographed image data to a storage medium accessible by a user, wherein the single interface unit identifies a type of the digital camera by reading information pre-stored in at least one of the memory of the digital camera and the digital camera selects a reading method software corresponding to the identified type of the digital camera from a plural reading method software that are stored, and reads the photographed image data recorded in the memory of the digital camera using the selected reading method software corresponding to the identified type of the digital camera; and wherein said reading method software is for reading the photographed image data recorded in said memory of said digital camera to a memory of said controller.

5. The data processing service system according to claim 4, wherein said controller stores said plural reading method software.

* * * * *

UNITED STATES PATENT AND TRADEMARK OFFICE
CERTIFICATE OF CORRECTION

PATENT NO. : 7,412,656 B2
APPLICATION NO. : 09/842017
DATED : August 12, 2008
INVENTOR(S) : Shoji Suzuki It is certified that error appears in the above-identified patent and that said Letters Patent is hereby corrected as shown below:

Title Page, Column 2 (U.S. Patent Documents), Line 9, change "Haneda" to --Shiota--.

Column 10, Line 29, change "camera" to --camera,--.

Signed and Sealed this

Eleventh Day of November, 2008

JON W. DUDAS
*Director of the United States Patent and Trademark Office*